(12) United States Patent
Monzen et al.

(10) Patent No.: US 8,702,415 B2
(45) Date of Patent: Apr. 22, 2014

(54) APPARATUS FOR FEEDING MOLTEN RESIN

(75) Inventors: Hideto Monzen, Kanagawa (JP);
Hiroyuki Hashimoto, Kanagawa (JP);
Takuya Fujikawa, Kanagawa (JP);
Hiroshi Hayashi, Saitama (JP); Tsuneo Imatani, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 247 days.

(21) Appl. No.: 12/670,414

(22) PCT Filed: Sep. 3, 2008

(86) PCT No.: PCT/JP2008/065872
§ 371 (c)(1),
(2), (4) Date: Jan. 25, 2010

(87) PCT Pub. No.: WO2009/037975
PCT Pub. Date: Mar. 26, 2009

(65) Prior Publication Data
US 2010/0189832 A1    Jul. 29, 2010

(30) Foreign Application Priority Data
Sep. 21, 2007    (JP) ................. 2007-245461

(51) Int. Cl.
*B29C 43/34*    (2006.01)
(52) U.S. Cl.
USPC ........ 425/258; 425/126.1; 425/256; 425/259; 425/345; 425/348 R
(58) Field of Classification Search
USPC .............. 425/126.1, 256, 257, 258, 259, 260, 425/344, 345, 346, 347, 348 R
See application file for complete search history.

(56) References Cited

U.S. PATENT DOCUMENTS

| | | | |
|---|---|---|---|
| 5,762,854 A | * | 6/1998 | Valyi .............................. 264/255 |
| 5,863,571 A | * | 1/1999 | Santais et al. ................. 425/526 |
| 6,349,838 B1 | * | 2/2002 | Saito et al. ..................... 215/371 |

(Continued)

FOREIGN PATENT DOCUMENTS

| | | |
|---|---|---|
| JP | 2000-108127 | 4/2000 |
| JP | 2005-059240 | 3/2005 |

(Continued)

OTHER PUBLICATIONS

U.S. Appl. No. 12/670,411, Hideto Monzen et al., filed on Jan. 25, 2010.

(Continued)

*Primary Examiner* — Seyed Masoud Malekzadeh
(74) *Attorney, Agent, or Firm* — Greenblum & Bernstein, P.L.C.

(57) ABSTRACT

The invention also provides for an apparatus for feeding molten resin, wherein the apparatus includes holding units each having a respective holding portion that is opened and closed to hold a molten resin that is discharged from an extrusion port of a die head of an extruder and is cut by a cutter while moving on a track, in which, after the respective holding portion transfers the molten resin from the extrusion port to a female mold, a side of the respective holding portion is opened and the molten resin is fed down to the female mold in a compression-molding machine, wherein a plurality of longitudinal grooves extending up and down are formed in an inner circumferential surface of the respective holding portion that holds the molten resin.

19 Claims, 7 Drawing Sheets

(56) References Cited

U.S. PATENT DOCUMENTS

| | | | |
|---|---|---|---|
| 6,592,923 B2* | 7/2003 | Chandler et al. | 426/512 |
| 6,837,696 B2* | 1/2005 | Sowden et al. | 425/112 |
| 6,982,094 B2* | 1/2006 | Sowden | 424/489 |
| 7,361,006 B2* | 4/2008 | Sowden et al. | 425/215 |
| 2003/0072799 A1* | 4/2003 | Sowden et al. | 424/464 |
| 2005/0031723 A1* | 2/2005 | Zoppas | 425/348 R |
| 2007/0196531 A1 | 8/2007 | Parrinello et al. | |
| 2008/0277830 A1 | 11/2008 | Balboni et al. | |
| 2009/0020903 A1* | 1/2009 | Takeuchi et al. | 264/148 |

FOREIGN PATENT DOCUMENTS

| | | |
|---|---|---|
| JP | 2007-216531 | 8/2007 |
| WO | 2005/102640 | 11/2005 |
| WO | 2005/102641 | 11/2005 |
| WO | 2006/109108 | 10/2006 |
| WO | 2007/045577 | 4/2007 |
| WO | 2007/094518 | 8/2007 |

OTHER PUBLICATIONS

International Search Report dated Oct. 14, 2008 that issued with respect to PCT/JP2008/065871.

International Search Report dated Oct. 14, 2008 that issued with respect to PCT/JP2008/065872.

Supplementary European Search Report that issued with respect to European Patent Application No. 08832352, mailed Sep. 17, 2010.

* cited by examiner

A

B

C

D

E

APPARATUS FOR FEEDING MOLTEN RESIN

TECHNICAL FIELD

This invention relates to an apparatus for feeding molten resin designed for falling a predetermined amount of a molten resin ejected from an extruder onto a female mold of a compression-molding machine.

BACKGROUND ART

Synthetic resin containers made from a synthetic resin such as polyester or polyethylene terephthalate (PET) have been widely put into practical use as containers for beverages. A preform that is to be formed into a synthetic resin container by blow-forming can be integrally formed by compression-molding by using a compression-molding machine. In executing the compression-molding, the synthetic resin in a molten state is extruded from an ejection port of a die head of an extruder and is fed to the compression-molding machine by a resin feeder.

The extruder heats and melts a resin material and continuously extrudes the molten resin from the die head. The molten resin generates acetaldehydes or oligomers depending upon the heating temperature. The acetaldehydes or oligomers deposited on a PET bottle adversely affect the taste. Therefore, the extruder extrudes the molten resin at a low temperature to suppress the generation of acetaldehydes or oligomers.

Even if the molten resin is extruded at a low temperature, however, acetaldehydes or oligomers generate in the form of a vapor in trace amounts and deposit on the holding unit upon coming in contact therewith. Further, the molten resin itself (e.g., resin scum, etc.) may often adhere and deposit.

Patent document 1: WO2005/102641

DISCLOSURE OF THE INVENTION

Problems to be Solved by the Invention

If acetaldehydes, oligomers and resin scum (hereinafter simply called oligomers) are formed in predetermined amounts, slipping property decreases at the time when the molten resin is to be fallen down onto a female mold of the compression-molding machine due to frictional resistance between the molten resin and the inner surface of the holding unit, or cooling becomes defective due to a decrease in the thermal conductivity. The molten resin that remains heated at a high temperature due to defective cooling is liable to adhere onto the holding unit. Even if holding means is opened, therefore, the molten resin does not fall down and cannot be fed into the metal mold of the compression-molding machine. To avoid such an inconvenience, a worker cleans the holding units every few hours. However, an increased frequency for cleaning matters deposited on the holding units imposes limitation on shortening the operation time and makes it difficult to increase the productivity.

Besides, the molten resin is continuously extruded from the die head even during the cleaning operation. Therefore, an increase in the cleaning operation time results in an increase in the loss of the resin material.

The above patent document 1 discloses a technology as a countermeasure for preventing matters from depositing on the holding units (holding fittings). This technology uses a porous material and permits a compressed gas to come in contact with the molten resin from the exterior through the porous material. As required, further, the surface of the molten resin or the inner surface of the molten resin-holding portion is cooled by the compressed gas to thereby cool the inner surface of the molten resin-holding portion and to suppress the adhesion upon cooling the inner surface of the molten resin-holding portion in the holding unit without, however, still making it possible to avoid the adhesion of oligomers to the holding unit to a sufficient degree since the treatment is done in the sealed holding unit.

The present invention was accomplished in view of the above circumstances and has an object of providing an apparatus for feeding molten resin capable of preventing the adhesion of matters such as oligomers on the holding units for holding the molten resin, and of shortening the cycle of cleaning the holding units.

Means for Solving the Problems

To achieve the above object, the apparatus for feeding molten resin of the invention includes holding units having a holding portion that can be opened and closed to hold a molten resin that is discharged from an extruder and is cut by a cutter, in which the holding portion is opened to throw the molten resin down to a female mold in a compression-molding machine, wherein a plurality of grooves extending up and down are formed in the inner circumferential surface of the holding portion that holds the molten resin.

In the apparatus for feeding molten resin, the holding portion can be provided with blowing means for blowing a gas onto the inner circumferential surface of the holding portion and/or the surface of the molten resin.

In the apparatus for feeding molten resin, the grooves formed in the inner circumferential surface of the holding portion have a corrugated shape in cross section.

In the apparatus for feeding molten resin, the blowing means is capable of flowing a gas onto the molten resin and onto the inner circumferential surface of the holding portion in a state where the holding portion is holding the molten resin.

In the apparatus for feeding molten resin, the inner circumferential surface of the holding portion has been treated.

Effect of the Invention

According to the present invention, the apparatus for feeding molten resin comprises holding units having a holding portion that can be opened and closed to hold a molten resin that is discharged from an extruder and is cut by a cutter, in which the holding portion is opened to throw the molten resin down to a female mold in a compression-molding machine, wherein a plurality of grooves extending up and down are formed in the inner circumferential surface of the holding portion that holds the molten resin. At the time of throwing the molten resin into the female mold in the compression-molding machine, therefore, the contact area between the molten resin-holding surface and the molten resin decreases, and slipping property is improved. Since oligomers that produce frictional resistance remain little on the holding unit, the molten resin can be smoothly fell down onto the female mold. It is, further, made possible to prevent the oligomers from adhering and depositing on the molten resin-holding surface of the holding unit, and the frequency of cleaning can be decreased.

The invention also provides for an apparatus for feeding molten resin, wherein the apparatus includes holding units each having a respective holding portion that is opened and closed to hold a molten resin that is discharged from an extrusion port of a die head of an extruder and is cut by a cutter while moving on a track, in which, after the respective holding portion transfers the molten resin from the extrusion port to a female mold, a side of said respective holding portion is opened and the molten resin is fed down to the female mold in a compression-molding machine, wherein a plurality of longitudinal grooves extending up and down are formed in an inner circumferential surface of the respective holding portion that holds said molten resin, wherein said plurality of grooves are structured and arranged to discharge oligomers formed in gaps located between the molten resin and said plurality of grooves via either an upper end or a lower end of said plurality of grooves, wherein said plurality of grooves are configured to prevent adhesion of said oligomers formed in the gaps so as to allow the molten resin to fall out into the female mold.

In embodiments, the respective holding portion is provided with a gas-blowing arrangement adapted for blowing a gas onto the inner circumferential surface of said holding portion and/or a surface of said molten resin.

In embodiments, the grooves formed in the inner circumferential surface of said respective holding portion have a corrugated shape in cross section.

In embodiments, the gas-blowing arrangement flows a gas onto the molten resin and onto the inner circumferential surface of said respective holding portion in a state where said respective holding portion is holding said molten resin.

In embodiments, the inner circumferential surface of said respective holding portion has been treated.

In embodiments, the longitudinal grooves are structured and arranged to reduce adherence of the molten resin to the inner circumferential surface so as to allow the molten resin to fall out into the female mold.

The invention also provides for an apparatus for feeding molten resin, wherein the apparatus comprises plural holding units, each having respective portions that are opened and closed to hold a section of molten resin. Each of the holding units is configured to transfer a cut section of the molten resin discharged from an extrusion port of a die head of an extruder to a female mold of a compression-molding machine. Each holding unit comprises a plurality of vertically extending grooves and projections arranged on an inner surface of each holding unit. The projections are configured to contact a respective section of the molten resin when being held within a respective holding unit. The grooves are structured and arranged to discharge oligomers formed in gaps located between the cut section of the molten resin and said grooves via either an upper end or a lower end of said grooves. The plurality of vertically extending grooves are configured to prevent adhesion of said oligomers formed in the gaps so as to allow the molten resin to fall out into the female mold.

In embodiments, the inner surface of said respective holding unit comprises gas-blowing openings.

In embodiments, the grooves are formed on the inner surface at one of above an area of the inner surface having no grooves and below an area of the inner surface having no grooves.

In embodiments, the inner surface comprises a coating.

The invention also provides for an apparatus for feeding molten resin, wherein the apparatus includes holding units having a respective holding portion that is opened and closed to hold a molten resin that is discharged from an extrusion port of a die head of an extruder and is cut by a cutter while moving on a track, in which, after the respective holding portion transfers the molten resin from the extrusion port to a female mold, a side of said respective holding portion is opened to allow the molten resin to move down into a female mold in a compression-molding machine, wherein a plurality of longitudinal grooves extending up and down are formed in an inner circumferential surface of the respective holding portion that holds said molten resin, wherein said plurality of grooves extend to either an upper end or a lower end of each holding portion and are structured and arranged to discharge oligomers formed in gaps located between the molten resin and said plurality of grooves via either the upper end or the lower end, wherein said plurality of grooves are configured to prevent adhesion of said oligomers formed in the gaps so as to allow the molten resin to fall out into the female mold.

In embodiments, the molten resin exits each respective holding unit without any trace of the plurality of grooves that result from a contact between the molten resin and the inner circumferential surface of the holding portion.

In embodiments, the cut section of molten resin exits each respective holding unit without any trace of the plurality of grooves that result from a contact between the cut section of the molten resin and the projections.

In embodiments, the molten resin exits each respective holding unit without any trace of the plurality of grooves that result from a contact between the molten resin and the inner circumferential surface of the respective holding portion.

In embodiments, the respective holding portion comprises a base portion and two movable holder portions, and wherein the plurality of grooves are formed on the base portion.

In embodiments, the respective holding portion comprises a base portion and two pivotally mounted holder portions, and wherein the plurality of grooves are formed on the two pivotally mounted holder portions.

In embodiments, the respective holding portion comprises a base portion and two holder portions movably mounted to the base portion and the plurality of grooves are formed on each of the base portion and the two holder portions.

In embodiments, the respective holding portion comprises a base portion and two movable holder portions, wherein the plurality of grooves are formed on the base portion and comprise a corrugated shape, and further comprising gas jet ports arranged on the base portion.

In embodiments, the respective holding portion comprises a base portion and two movable holder portions, and wherein the plurality of grooves are formed on the base portion and the two movable holder portions and comprise a groove depth of between 0.3 and 3 mm.

Figure 1:
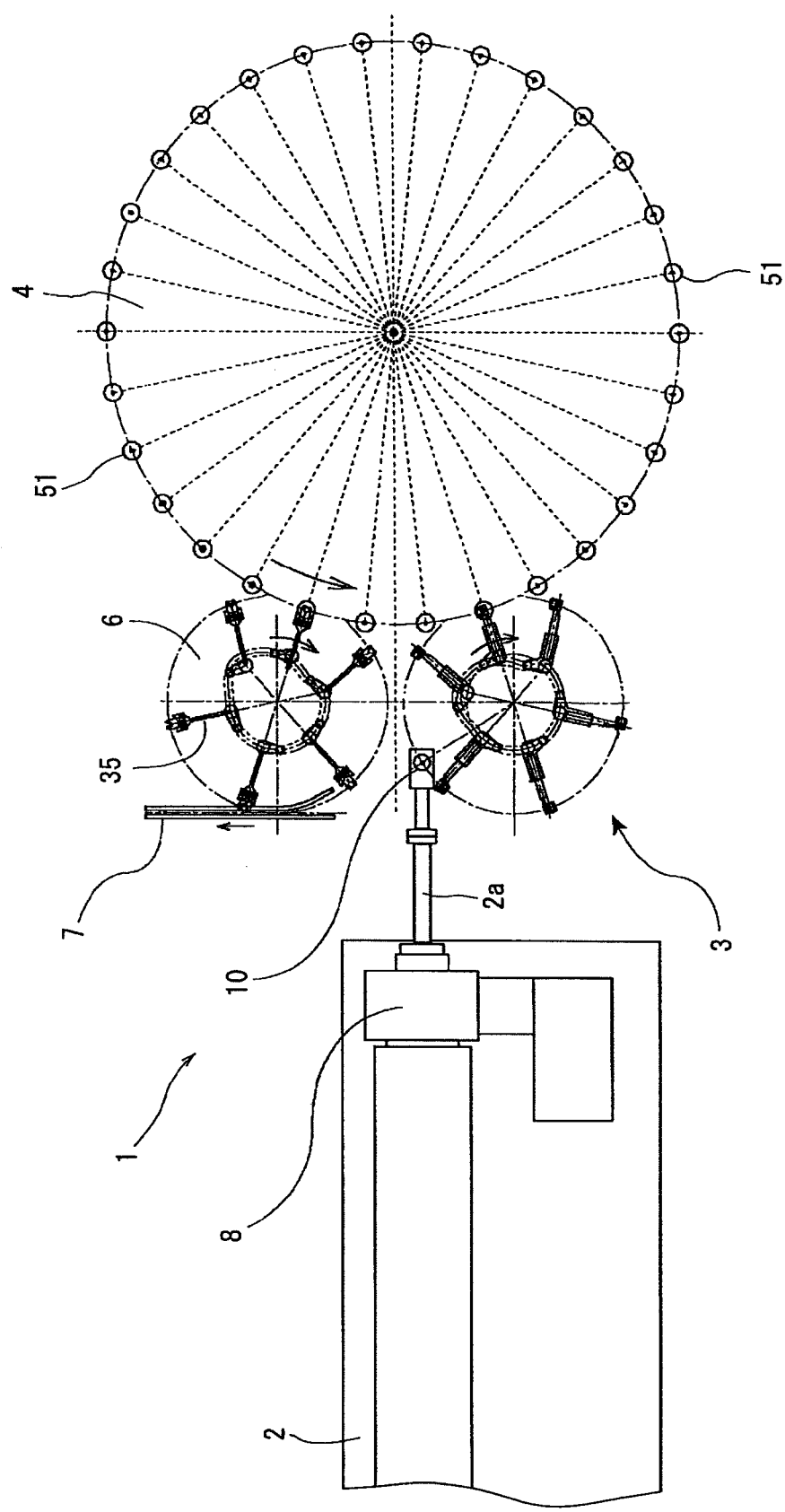
FIG. 1 is a plan view schematically illustrating a whole compression-molding apparatus equipped with an apparatus for feeding resin according to an embodiment of the invention.

DESCRIPTION OF REFERENCE NUMERALS 1 apparatus for feeding molten resin
2 extruder
3 apparatus for feeding resin
4 compression-molding machine
9 molten resin
17 holding unit
21 base portion
22, 23 holders
24, 25 recessed holding portions
27 preform
31 longitudinal grooves
31a recessed portions
31b protruded portions
24 jet ports

BEST MODE FOR CARRYING OUT THE INVENTION

An apparatus for feeding resin according to an embodiment of the invention will now be described with reference to the drawings.

FIG. 1 is a plan view schematically illustrating a compression-molding apparatus for forming a preformed article called preform such as of PET bottle or the like bottle.

The compression-molding apparatus 1 includes an extruder 2, a resin feeder 3, a compression-molding machine 4, an outlet wheel 6 and a take-out conveyer 7.

The extruder 2 has nearly a cylindrical outer shape, heats, melts and kneads a synthetic resin material such as PET, and conveys the molten resin to a gear pump 8. The gear pump 8 ejects the molten resin maintaining stability relying upon the mesh of gears. An ejection port of the gear pump 8 is connected to a downwardly oriented die head 10 via a conduit 2a. The die head 10 has a cylindrical shape in cross section, and the synthetic resin in a molten state is continuously extruded down from the die head 10 in nearly a cylindrical shape.

Figure 2:
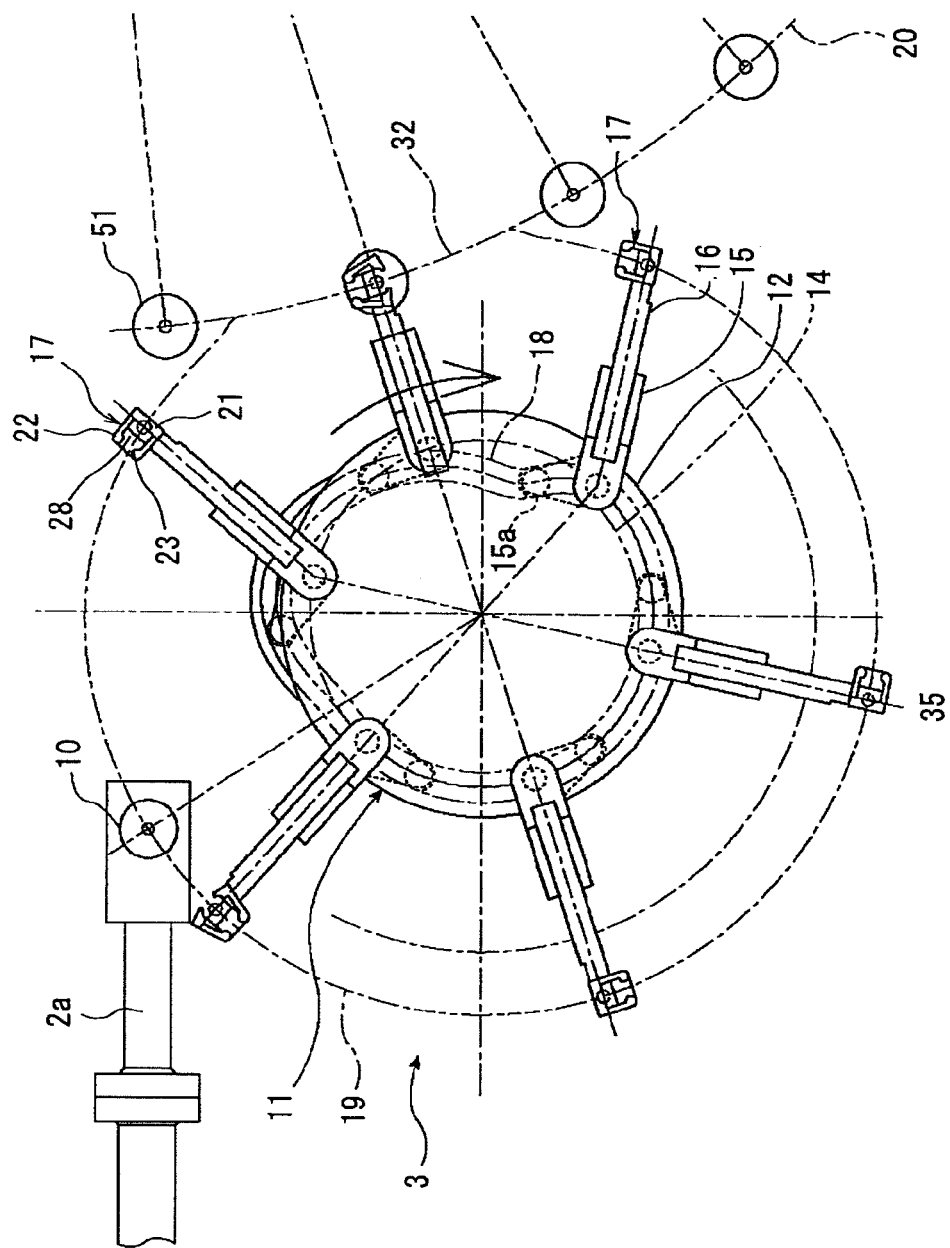
FIG. 2 is a plan view illustrating the periphery of the apparatus for feeding resin of FIG. 1 on an enlarged scale.
Figure 3:
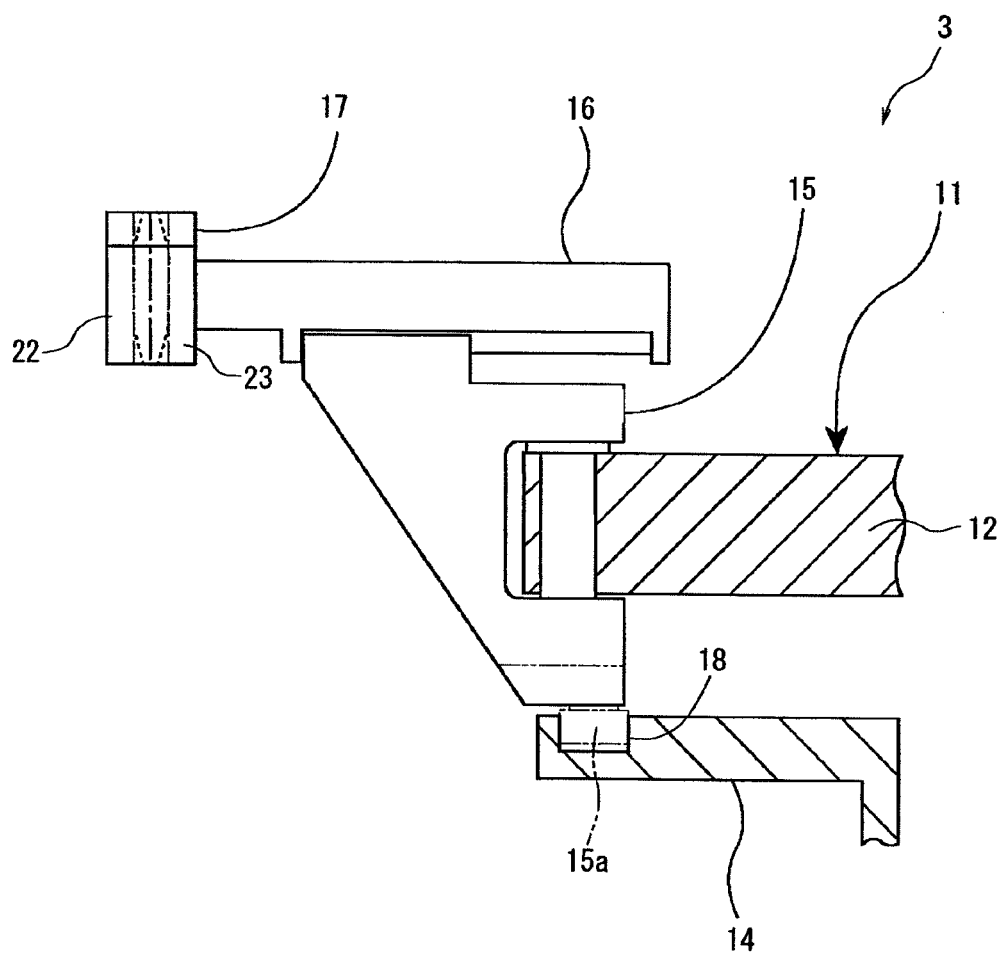
FIG. 3 is a side view of a structural member supporting a holding unit of the compression-molding machine of FIG. 1.

FIG. 2 is a plan view of the apparatus for feeding resin according the embodiment of the invention, and FIG. 3 is a side view of major portions of the apparatus for feeding resin on an enlarged scale.

The apparatus 3 for feeding resin is provided with a cutter wheel 11. The cutter wheel 11 includes a rotary plate 12, a swing cam 14, swing units 15, expansion-contruction units 16 and holding units 17. The rotary plate 12 is a disk-like member and has swing units 15 in a number of six in the drawing along the circumferential edge maintaining an equal angular distance so as to turn together with the rotary plate 12. The rotary plate 12 has a motor (not shown) as drive means and rotates in the clockwise direction as viewed from the upper side.

The swing unit 15 has a cam follower at the lower part thereof. When the rotary plate 12 rotates, the cam follower moves along a groove 18 formed in the swing cam 14 and swings.

The expansion-contruction unit 16 is a rod-like member extending nearly in the radial direction of the rotary plate 12, and has a holding unit 17 at the distal end portion on the outer circumferential side thereof. The expansion-contruction unit 16 is provided in an upper part of the swing unit 15 via a linear bearing or the like so as to reciprocally move in the lengthwise direction of the swing unit 15. The expansion unit reciprocally moves nearly in the radial direction of the rotary plate 12 due, for example, to an air cylinder, a cam, a spring or a motor or a combination thereof (not shown).

Due to the swinging motion of the swing unit 15 and the reciprocal motion of the expansion-contruction unit 16, the holding unit 17 turns along a track 19 at the time of operation, and moves along a rotary track 20 of a metal mold 51 before and after handing the molten resin over to the metal mold 51 of the compression-molding machine 4. Even when operated at a high speed, therefore, the molten resin can be reliably handed over.

Figure 4:
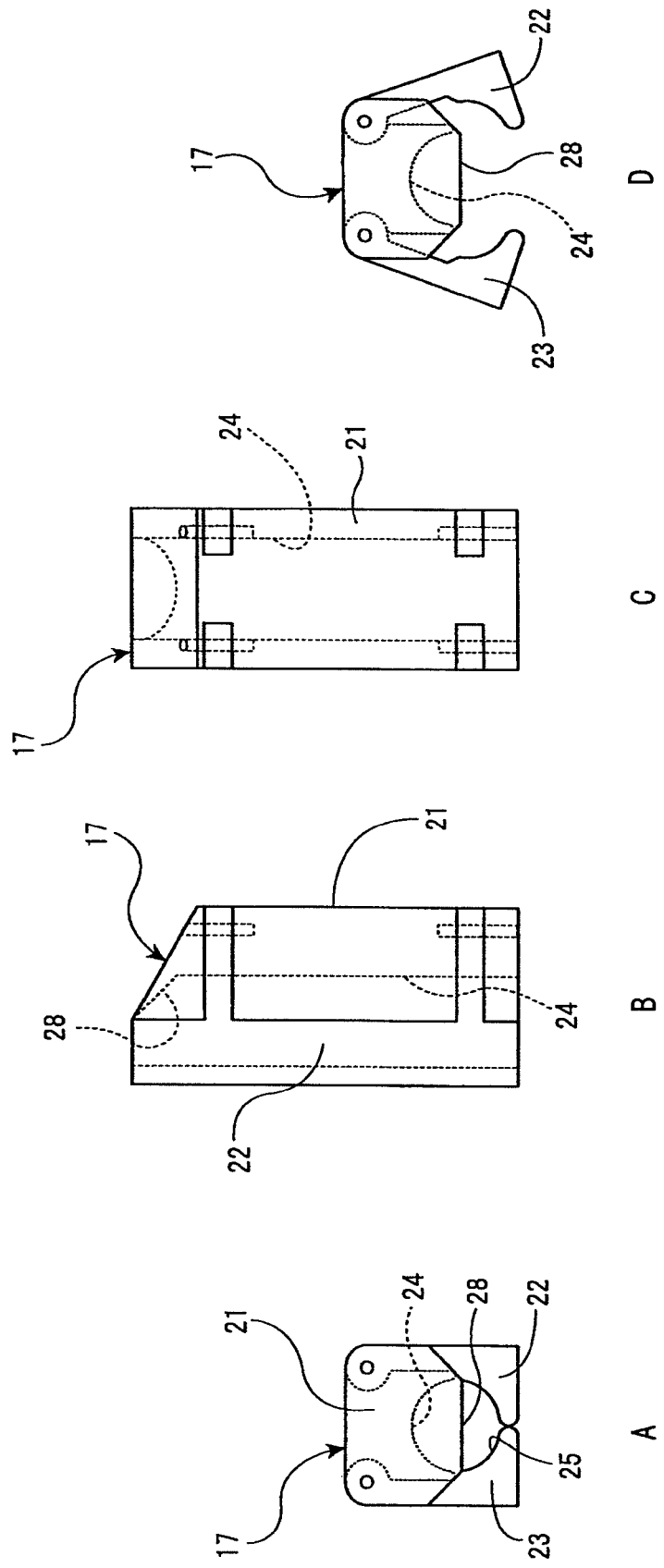
FIG. 4 is a view schematically illustrating the structure of the holding unit of the apparatus for feeding resin of FIG. 1, wherein A is a plan view of the holding unit, B is a right side view thereof, C is a back view thereof, and D is a plan view in a state where the holding unit is opened.

FIG. 4 illustrates major portions of the holding unit, where A is a plan view in a state where the holding unit is closed, B is a right side view thereof, C is a back view thereof and D is a plan view in a state where the holding unit is opened.

The holding unit 17 includes a base portion 21, a pair of holders 22 and 23, and a cutter 28. More closely, the base portion 21 has a recessed holding portion 24 of a semi-circular shape formed therein and the cutter 28 formed at an upper part thereof protruding aslant and upward in the direction of rotation. The base portion 21 has the holders 22 and 23 that are attached so as to rotate freely and, therefore, to be opened and closed freely. The holders 22 and 23 are actuated by rotary means such as a rotary actuator or a cam mechanism, and are opened on the upstream of the die head 10 and are closed just after having passed over the die head 10. In their closed state, the holders 22 and 23 form a recessed holding portion 25 which holds the molten resin cut by the cutter 28 in cooperation with the recessed holding portion 24 in the base portion 21. The holding unit 17 conveys the molten resin that is cut in a state where the holders 22 and 23 are closed. When arrived over the metal mold 51, the holding unit 17 opens the holders 22 and 23 to let the molten resin fall down on the lower metal mold 51.

Figure 5:
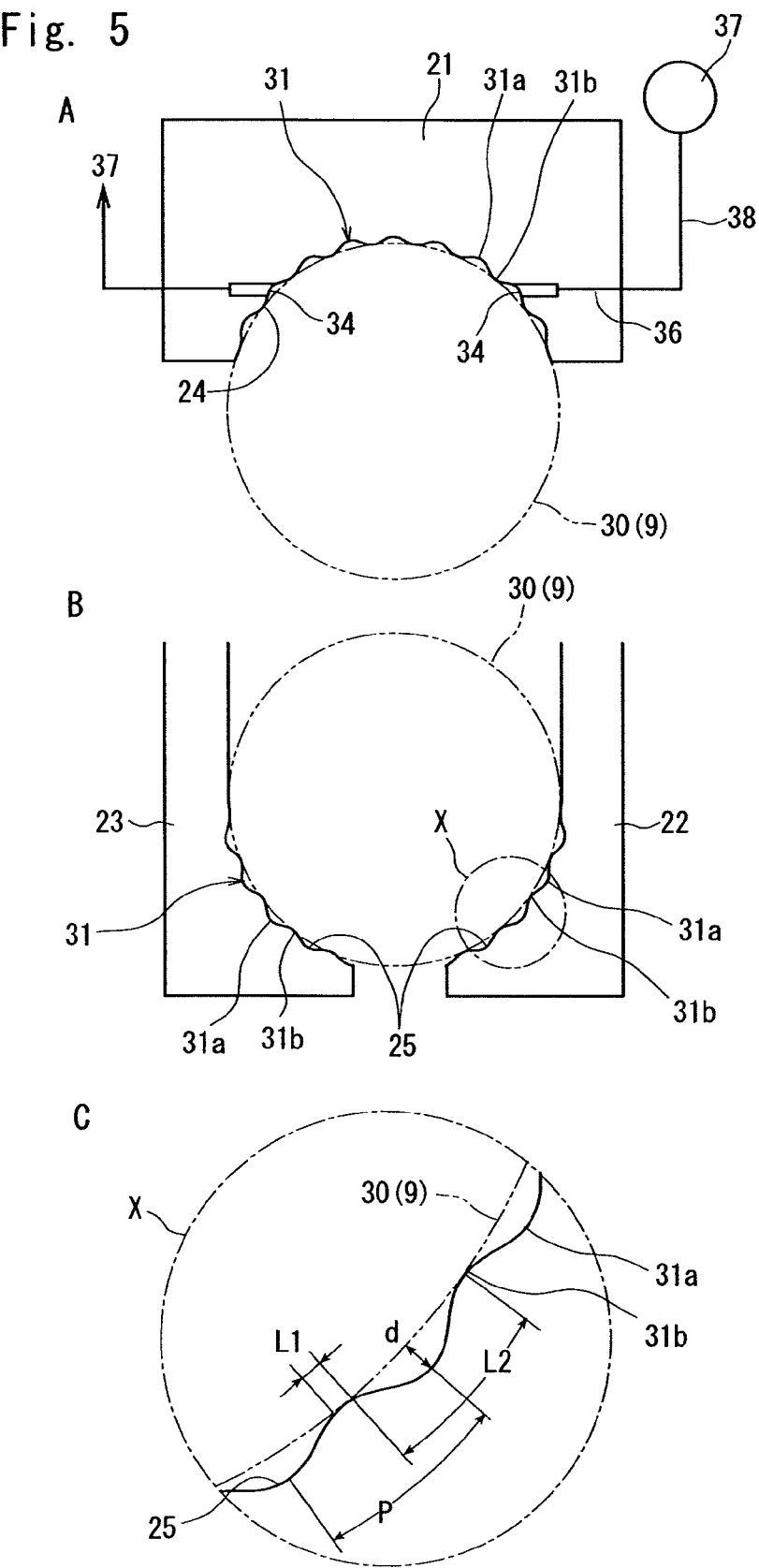
FIG. 5A is a sectional view in a horizontal direction of a base portion of the holding unit of FIG. 1, B is a sectional view in the horizontal direction of holders of the holding unit, and C is a sectional view of longitudinal grooves in a circle X in B on an enlarged scale.

FIG. 5 is a sectional view in the horizontal direction of grooves 31 in the base portion 21 and in the pair of holders 22 and 23.

As shown, longitudinal grooves 31 having a corrugated shape in transverse cross section and constituted by recessed and protruded portions 31a and 31b, are formed in the recessed holding portion 24 comprising the inner circumferential surface of the base portion 21 and in the recessed holding portion 25 comprising the inner circumferential surfaces of the holders 22 and 23.

Here, if the recessed holding portions 24 and 25 for holding the molten resin 9 have a size of a basic circle 30 shown in FIG. 5, the protruded portions 31b of the recessed and protruded portions 31a and 31b are so positioned that their end portions are arranged along the basic circle 30 as shown in FIG. 5C. It is desired that the protruded portions 31b have a width (circumferential length) L1 of 0.1 to 3 mm that comes in contact with the molten resin 9. It is desired that the protruded portions 31b are provided over the circumferential length of the recessed holding portion 24, or over 10 to 50% of the circumferential length of the recessed holding portion 25 or, more preferably, over 10 to 30% thereof.

It is, further, desired that the recessed portions 31a have a maximum depth d of 0.3 to 3 mm from the basic circle 30. Of the recessed and protruded portions 31a and 31b, it is desired that the portions that will not come in contact with the molten resin 9 have a width (circumferential width of a section) L2 of 1 to 5 mm.

It is, further, desired that the arrangement of a recessed portion 31a to another recessed portion 31a (or a protruded portion 31b to another protruded portion 31b) has a pitch P of 1 to 15 mm.

The recessed and protruded portions 31a and 31b in this embodiment have a corrugated shape which is a curved shape, but may also be formed to have a rectangular shape or a triangular shape. The recessed and protruded portions 31a and 31b are formed maintaining an equal angular gap in the circumferential direction. However, they do not necessarily have to be formed maintaining an equal angular gap, but the gap among the recessed and protruded portions 31a, 31b in the base portion 21 may be differed from the gap among the recessed and protruded portions 31a, 31b in the holders 22 and 23.

It is desired that the surfaces of the recessed holding portions 24 and 25 for holding the molten resin 9 have been so treated that the oligomers will not adhere thereon. In this embodiment, an iepco-treatment or a fluorine coating has been effected.

Figure 6:
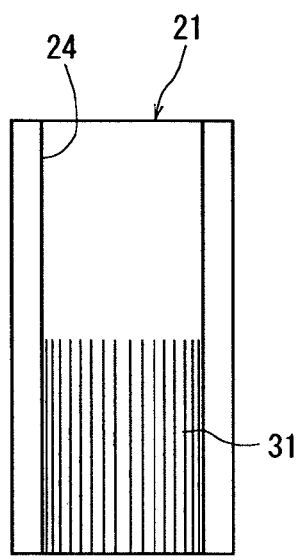
FIG. 6 illustrates the longitudinal grooves formed in the base portion of the holding unit of FIG. 5, wherein A is a front view of a state where longitudinal grooves are formed in a recessed holding portion in the base portion from an upper portion of the intermediate position thereof down to the lower end thereof, B is a front view of a state where longitudinal grooves are formed in the recessed holding portion from a lower portion of the intermediate position thereof up to the upper end thereof, C is a front view of a state where longitudinal grooves are formed in the whole recessed holding portion from the upper end thereof down to the lower end thereof, D is a front view of a case where the longitudinal grooves are the same as those of A above but where gas jet ports are formed, and E is a front view of a case where the longitudinal grooves are the same as those of C above but where gas jet ports are formed in the longitudinal grooves.
Figure 6:
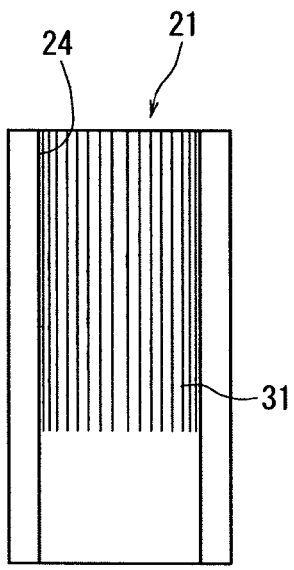
Figure 6:
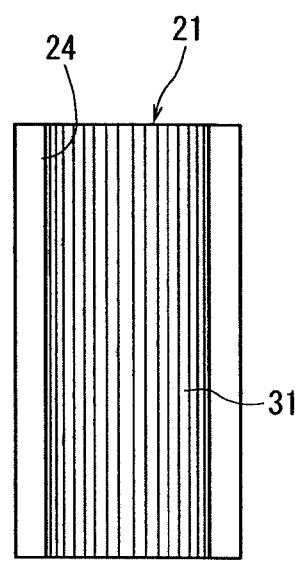
Figure 6:
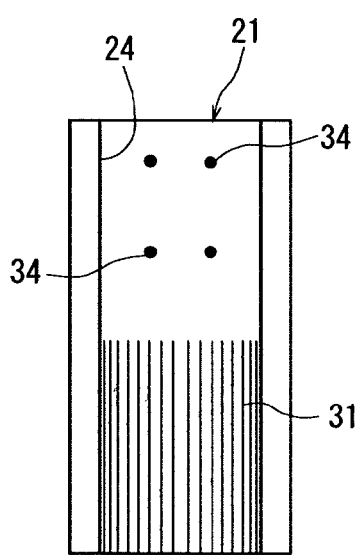
Figure 6:
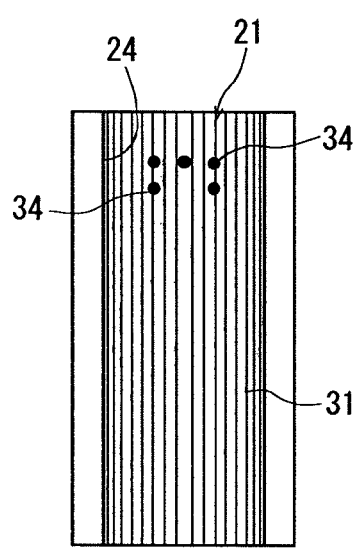

FIGS. 6A to 6C show the positions where the longitudinal grooves 31 are formed. FIGS. 6A to 6C illustrate the recessed holding portion 24 in the base portion 21. As for the pair of holders 22 and 23, the positions where the longitudinal grooves 31 are formed are the same as those of the base portion 21 or are formed in combination with the arrangements of longitudinal grooves of different modes as described below.

In FIG. 6A, the longitudinal grooves 31 are not formed in the recessed holding portion 24 of the base portion 21 from the upper portion to the middle portion thereof but are formed in the lower portion of the recessed holding portion 24. In FIG. 6B, the longitudinal grooves 31 are not formed in the lower portion of the recessed holding portion 24 but are formed from the upper end through the middle portion down to the lower portion of the recessed holding portion 24. FIG. 6C is a case where the longitudinal grooves 31 are formed in the whole recessed holding portion 24 from the upper end to the lower end thereof. Further, though not shown, the longitudinal grooves 31 may be formed in the recessed holding portion 24 at the intermediate position only in the up-and-down direction. In this case, if formed to be longer than the overall height of the molten resin 9, the oligomers are allowed to escape out of the holding unit 17 through the lower side of the longitudinal grooves 31 (or through the upper side thereof depending upon the position at where the molten resin 9 is held), which is desirable. Further, the longitudinal grooves 31 may be formed in the upper portion and in the lower portion of the recessed holding portion 24 except the middle portion thereof.

Referring to FIG. 6A and other drawings, it is desired that the range in which no longitudinal groove 31 is formed is selected to be the overall height of the molten resin 9+10% thereof. This is because, no traces of grooves remain on the molten resin 9 that result from the press-contact with the longitudinal grooves 31 even after the apparatus 1 for feeding molten resin is operated at a high speed, the resin extruded from the die head 10 is cut by the cutter and, thereafter, the molten resin 9 is supported by the base portion 21.

In FIG. 6D, the longitudinal grooves 31 are formed at the same positions as those of the longitudinal grooves 31 shown in FIG. 6A. In the upper portion and middle portion of the recessed holding portion 24 where no longitudinal groove 31 is formed, gas jet ports 34 are formed. The jet ports 34 are communicated with flow passages 36 passing through the inner wall of the base portion 21, the flow passages 36 being connected togas jet means 37 that is not shown through pipes 38 (see FIG. 5A). The gas jet means 37 uses an inert gas or a compressed inert gas such as nitrogen, a gas or a compressed gas such as the air.

The direction of jet ports 34 (direction in which the gas ejects) can be set variously, such as perpendicularly, or at a predetermined angle, to the recessed holding portion 24. However, if it is attempted to flow the gas in the circumferential direction of the molten resin 9 as shown in FIG. 5A, then the gas flows over the whole circumference of the molten resin 9, which is desirable.

In FIG. 6E, the longitudinal grooves 31 are formed at the same positions as those of the longitudinal grooves 31 shown in FIG. 6C. The gas jet ports 34 can also be formed in the portion where the longitudinal grooves 31 are formed. Here, the gas injection ports 34 may be formed on the side of the protruded portions 31b of the recessed holding portion 24. As shown in FIG. 5A, however, it is better that the jet ports 34 are formed in the recessed portions 31a, since the flow of gas is little prevented by the molten resin 9 and easily flows in the up-and-down direction of the base portion 21. Moreover, the longitudinal grooves 31 may have jet nozzles arranged at the upper portion of the base portion 21 or at the lower portion of the base portion 21. Further, the number of ports may be suitably increased. The jet nozzles may further be provided in the holders 22 and 23.

FIG. 7A illustrates a state where the holding unit 17 is conveyed to just over the cavity mold 52.

Figure 7:
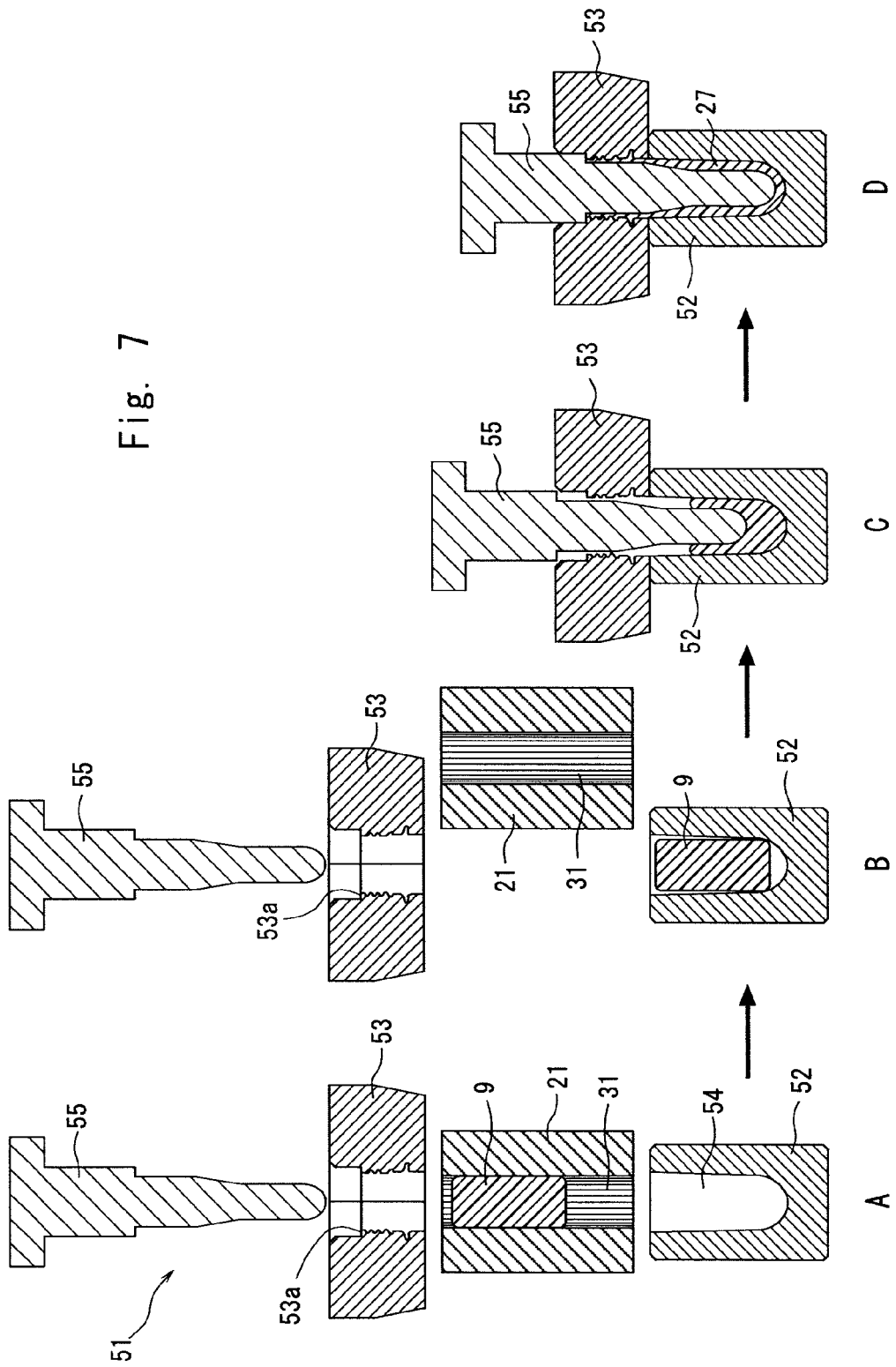
FIG. 7 is a view illustrating steps of compressing a preform in the compression-molding machine shown in FIG. 1, wherein A is a sectional view illustrating a state of just before a molten resin is fed to a cavity mold from a holding unit, B is a sectional view illustrating a state where the molten resin is fed into the cavity mold, C is a sectional view illustrating a state where neck halves are coupled onto the cavity mold and a core is inserted in a through hole and in an inner hole thereof, and D is a sectional view illustrating a state where the molten resin is compressed to form a preform.

The compression-molding machine 4 is provided to so rotate that a plurality of cavity molds 52 move on a circular track consecutively (see FIG. 1). The cavity mold 52 is opened at an upper part thereof, and, over the cavity mold 52, neck halves 53 that serve as an upper mold are provided so as to move up and down relative to the cavity mold 52 as shown in the drawings of FIG. 7.

At a position where the molten resin 9 is handed over, the holding unit 17 is arranged between the neck halves 53 and the cavity mold 52 so that, upon opening the holders 22 and 23, the molten resin 9 can be fed into the inner hole 54 of the cavity mold 52. Referring to FIG. 7B, after the molten resin 9 is fed to the cavity mold 52, the holding unit 17 separates away from the rotary track 20 of the compression-molding machine 4 (see FIG. 2).

The neck halves 53 are formed by a pair of right and left molds that open and close in a horizontal direction, and a core 55 that moves up and down is arranged on the upper side of the cavity mold 52. The core 55 is pushed into a through hole 53a in the neck halves 53 and in the inner hole 54 in the cavity mold 52 so as to compression-form the molten resin 9 into a preform.

Referring to FIG. 1, an outlet wheel 6 is disposed on the downstream of the compression-molding machine 4 to take out the preforms. The outlet wheel 6 has a take-out conveyer 7 for conveying the preforms to a next step.

Next, described below is the action of the apparatus for feeding resin according to the embodiment of the invention.

The extruder 2 heats, melts and kneads a synthetic resin material such as polyethylene terephthalate, and conveys the molten resin 9 to the gear pump 8. In order to stably feed the molten resin 9, the gear pump 8 is so constituted as to eject the molten resin 9 by the mesh of gears. The gear pump 8 conveys the molten resin to the downwardly oriented die head 10 shown in FIG. 2 via the conduit 2a. The die head 10 continuously and downwardly extrudes the molten resin 9 formed in a nearly cylindrical shape through an extrusion port formed in the lower end portion thereof.

The extruded molten resin 9 is cut by the cutter 28 and is separated away from the extrusion port. Upon closing the holders 22 and 23 of the holding unit 17, the separated molten resin 9 is held in the recessed holding portions 24 and 25. At the time of being ejected from the die head 10, the molten resin 9 is generating acetaldehydes or oligomers in the form a vapor. Therefore, a gas is ejected from the jet ports 34 prior to closing the holders 22 and 23. Upon ejecting the gas, the oligomers can be blown out of the holding unit 17 cooling, at the same time, the recessed holding portions 24 and 25 that work to hold the molten resin 9 and, therefore, cooling the surface of the molten resin 9.

Upon cooling the inner surfaces of the recessed holding portions 24 and 25 and the surface of the molten resin as described above, the molten resin 9 little adheres on the inner surfaces of the recessed holding portions 24 and 25.

Since gaps are formed by the recessed and protruded portions 31a and 31b between the molten resin 9 and the recessed holding portions 24, 25, the molten resin 9 held by the holding unit 17 permits the oligomers to escape from the upper ends or the lower ends of gaps. Upon forming the jet ports 34 in the recessed portions 31a, further, the gas ejected from the jet ports 34 flows through the gaps between the longitudinal grooves 31 and the molten resin 9. Through the gaps, the oligomers generated in the holding unit 17 while the molten resin 9 is being conveyed can be discharged to the exterior.

The holding unit 17 moves on a circular track while holding the molten resin 9. After having moved to just over cavity mold 52 of the compression-molding machine 4, the holding unit 17 enters into between the cavity mold 52 and the neck halves 53 as shown in FIG. 7A. That is, when the tracks have moved onto just the same track 32 (see FIG. 2), the holders 22 and 23 of the holding unit 17 are opened, and the molten resin 9 is fed from the holding unit 17 into the inner hole 54 of the cavity mold 52.

Here, since longitudinal grooves 31 are formed in the recessed holding portions 24 and 25 of the holding unit 17, the contact area decreases between the inner surfaces of the recessed holding portions 24, 25 and the molten resin. Therefore, the molten resin 9 exhibits improved slipping property and can be efficiently fallen into the inner hole 54. The oligomers in the form of a vapor having a property to adhere on the inner surfaces of the recessed holding portions 24 and 25 are discharged to the exterior through the gaps of longitudinal grooves 31 and adhere little on the recessed holding portions 24 and 25.

Upon preventing the adhesion of oligomers as described above, it is made possible to avoid such an inconvenience that the molten resin does not fall despite the holding grip 17 is opened and that the molten resin is not fed into the metal mold of the compression-molding machine. Further, even if the oligomers have adhered, the amount of adhesion thereof can be decreased and the time can be lengthened before it becomes necessary to effect the cleaning, offering an effect of decreasing the loss of the resin material.

Referring to FIG. 7C, the neck halves 53 move down and are arranged on the cavity mold 52. Thereafter, the core 55 moves down and enters in the through hole 53a and the inner hole 54.

Referring to FIG. 7D, a gap is formed in the same shape as the preform 27 that is to be formed, the molten resin 9 fills the inner hole 54 and the gap on the side of the neck halves 53. Being compressed by the core 55, therefore, the molten resin 9 is formed into the preform 27.

After having been formed, the preform 27, while being cooled, approaches the circular track of the grip 35 of the outlet wheel 6 due to the motion of the cavity mold 52 as shown in FIG. 1. Thereafter, the neck halves 53 and the core 55 move up while supporting the preform 27, and the preform 27 is taken out of the cavity mold 52, is transferred onto the take-out conveyer 7 and is conveyed onto a forming line of blow-forming in the next step.

When formed into a container by blow-forming, the preform 27 is free of acetaldehydes or oligomers and does not adversely affect the taste of beverages.

Though the invention was described above by way of an embodiment, it should be noted that the invention can be modified or altered in a variety of other ways without departing from the technical scope of the invention, as a matter of course.

For example, the longitudinal grooves 31 may be of a helical shape inclined to a degree that will not hinder the molten resin 9 from falling.

Further, the cutter 28 may not be provided on the holding unit 17 but may be separately provided, for example, under the die head 10 of the extruder 2.

Moreover, the apparatus is not limited to the one in which the holding units 17 and the metal molds are continuously rotating in many number, but may be the one in which they are used each in a number of one or the one of the linearly conveying type.

The invention claimed is:

1. An apparatus for feeding molten resin, the apparatus including holding units each having a respective holding portion that is opened and closed to hold a molten resin that is discharged from an extrusion port of a die head of an extruder and is cut by a cutter while moving on a track, in which, after the respective holding portion transfers the molten resin from the extrusion port to a female mold, a side of said respective holding portion is opened and the molten resin is fed down to the female mold in a compression-molding machine, wherein a plurality of longitudinal grooves extending up and down are formed in an inner circumferential surface of the respective holding portion that holds said molten resin, wherein said plurality of grooves are structured and arranged to discharge oligomers formed in gaps located between the molten resin and said plurality of grooves via either an upper end or a lower end of said plurality of grooves, wherein said plurality of grooves are configured to prevent adhesion of said oligomers formed in the gaps so as to allow the molten resin to fall out into the female mold.

2. The apparatus for feeding molten resin according to claim 1, wherein said respective holding portion is provided with a gas-blowing arrangement adapted for blowing a gas onto the inner circumferential surface of said holding portion and/or a surface of said molten resin.

3. The apparatus for feeding molten resin according to claim 1, wherein said grooves formed in the inner circumferential surface of said respective holding portion have a corrugated shape in cross section.

4. The apparatus for feeding molten resin according to claim 2, wherein said gas-blowing arrangement flows a gas onto the molten resin and onto the inner circumferential surface of said respective holding portion in a state where said respective holding portion is holding said molten resin.

5. The apparatus for feeding molten resin according to claim 1, wherein the inner circumferential surface of said respective holding portion has been treated.

6. The apparatus for feeding molten resin according to claim 1, wherein said longitudinal grooves are structured and arranged to reduce adherence of the molten resin to the inner circumferential surface so as to allow the molten resin to fall out into the female mold.

7. An apparatus for feeding molten resin, the apparatus comprising:
   plural holding units, each having respective portions that are opened and closed to hold a section of molten resin;
   each of the holding units being configured to transfer a cut section of the molten resin discharged from an extrusion port of a die head of an extruder to a female mold of a compression-molding machine;
   each holding unit comprising a plurality of vertically extending grooves and projections arranged on an inner surface of each holding unit;
   said projections being configured to contact a respective section of the molten resin when being held within a respective holding unit; and
   said grooves being structured and arranged to discharge oligomers formed in gaps located between the cut section of the molten resin and said grooves via either an upper end or a lower end of said grooves,
   wherein said plurality of vertically extending grooves are configured to prevent adhesion of said oligomers formed in the gaps so as to allow the molten resin to fall out into the female mold.

8. The apparatus for feeding molten resin according to claim 7, wherein the inner surface of said respective holding unit comprises gas-blowing openings.

9. The apparatus for feeding molten resin according to claim 7, wherein said grooves are formed on the inner surface at one of:
   above an area of the inner surface having no grooves; and
   below an area of the inner surface having no grooves.

10. The apparatus for feeding molten resin according to claim 7, wherein the inner surface comprises a coating.

11. An apparatus for feeding molten resin, the apparatus including holding units having a respective holding portion that is opened and closed to hold a molten resin that is discharged from an extrusion port of a die head of an extruder and is cut by a cutter while moving on a track, in which, after the respective holding portion transfers the molten resin from the extrusion port to a female mold, a side of said respective holding portion is opened to allow the molten resin to move down into a female mold in a compression-molding machine, wherein a plurality of longitudinal grooves extending up and down are formed in an inner circumferential surface of the respective holding portion that holds said molten resin, wherein said plurality of grooves extend to either an upper end or a lower end of each holding portion and are structured and arranged to discharge oligomers formed in gaps located between the molten resin and said plurality of grooves via either the upper end or the lower end, wherein said plurality of grooves are configured to prevent adhesion of said oligomers formed in the gaps so as to allow the molten resin to fall out into the female mold.

12. The apparatus for feeding molten resin according to claim 11, wherein the molten resin exits each respective holding unit without any trace of the plurality of grooves that result from a contact between the molten resin and the inner circumferential surface of the holding portion.

13. The apparatus for feeding molten resin according to claim 7, wherein the cut section of molten resin exits each respective holding unit without any trace of the plurality of grooves that result from a contact between the cut section of the molten resin and the projections.

14. The apparatus for feeding molten resin according to claim 1, wherein the molten resin exits each respective holding unit without any trace of the plurality of grooves that result from a contact between the molten resin and the inner circumferential surface of the respective holding portion.

15. The apparatus for feeding molten resin according to claim 1, wherein the respective holding portion comprises a base portion and two movable holder portions, and wherein the plurality of grooves are formed on the base portion.

16. The apparatus for feeding molten resin according to claim 1, wherein the respective holding portion comprises a base portion and two pivotally mounted holder portions, and wherein the plurality of grooves are formed on the two pivotally mounted holder portions.

17. The apparatus for feeding molten resin according to claim 1, wherein the respective holding portion comprises a base portion and two holder portions movably mounted to the base portion and the plurality of grooves are formed on each of the base portion and the two holder portions.

18. The apparatus for feeding molten resin according to claim 1, wherein the respective holding portion comprises a base portion and two movable holder portions, wherein the plurality of grooves are formed on the base portion and comprise a corrugated shape, and further comprising gas jet ports arranged on the base portion.

19. The apparatus for feeding molten resin according to claim 1, wherein the respective holding portion comprises a base portion and two movable holder portions, and wherein the plurality of grooves are foamed on the base portion and the two movable holder portions and comprise a groove depth of between 0.3 and 3 mm.

* * * * *